TAG ATTACHING OR BUNDLE FASTENING DEVICE

Original Filed April 26, 1967

United States Patent Office

Re. 27,357
Reissued May 9, 1972

27,357

TAG ATTACHING OR BUNDLE FASTENING DEVICE

Francis G. Merser, Framingham, Mass., assignor to Dennison Manufacturing Company, Framingham, Mass.

Original No. 3,402,435, dated Sept. 24, 1968, Ser. No. 633,782, Apr. 26, 1967. Application for reissue Sept. 23, 1970, Ser. No. 74,944

Int. Cl. B65d *63/00*

U.S. Cl. 24—16 PB 9 Claims

Matter enclosed in heavy brackets [ ] appears in the original patent but forms no part of this reissue specification; matter printed in italics indicates the additions made by reissue.

ABSTRACT OF THE DISCLOSURE

A fastening device for attaching, bundling, affixing or other holding of one or more articles, the device comprising a filament, a socket on the filament and a head on one end of the filament adapted to snap into the socket.

Objects of the invention are to provide a device which is simple and inexpensive to produce, which can be applied quickly and easily and which holds securely.

According to this invention the device comprises a filament, a socket on one end of the filament and a head on the other end of the filament, the socket having an opening extending therethrough so that the head may be inserted in one end of the opening and project from the other end of the opening, the head being slightly larger than the socket and the socket being resilient so that insertion of the head produces expansion of the socket and after the head has been inserted the socket snaps in behind the head to restrain withdrawal of the head from the socket. Preferably said other end of the socket is slotted to facilitate said expansion, the socket is circular and the head is conical. In the preferred embodiment the portion of the filament adjacent the head has reduced diameter and is brittle so that the projecting head may be broken off to withdraw the filament from the socket.

For the purpose of illustration a typical embodiment of the invention is shown in the accompanying drawings in which.

Figure 1:
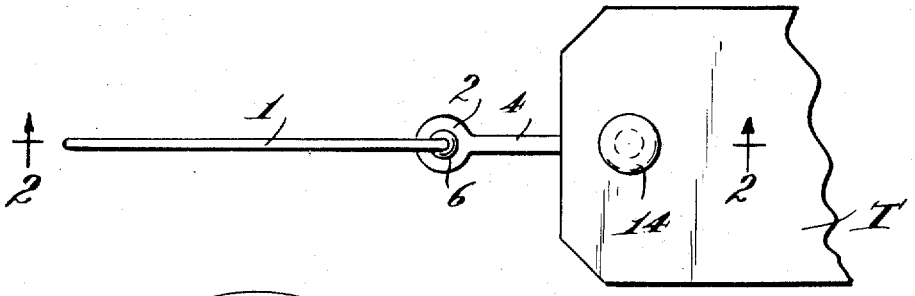
FIG. 1 is a top view of the device attached to a tag.
Figure 2:
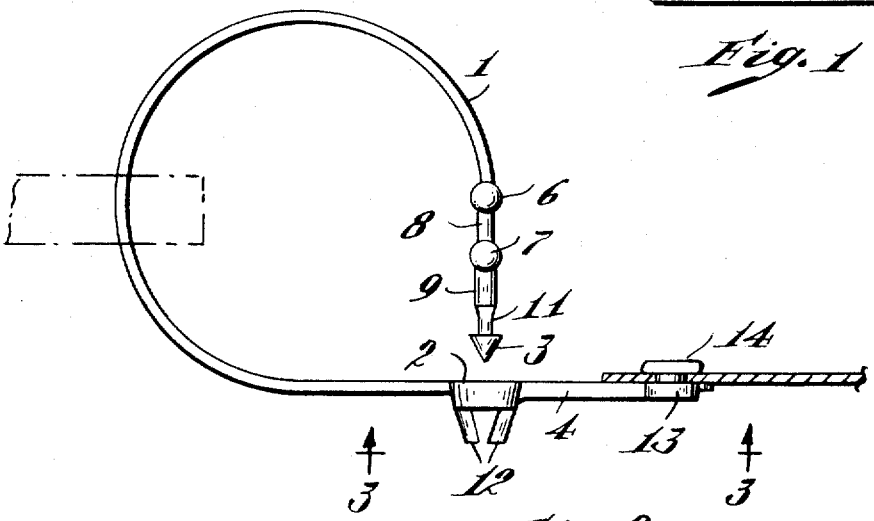
FIG. 2 is a side view of the device before the head has been inserted in the socket.
Figure 3:
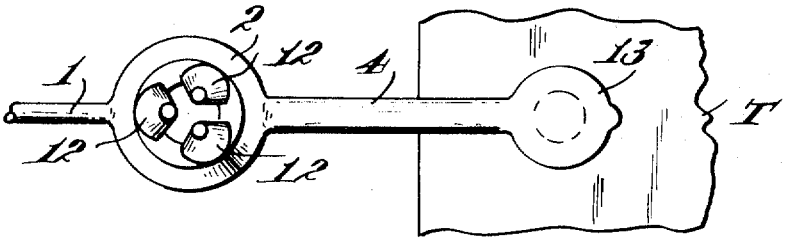
FIG. 3 is a bottom view.
Figure 4:
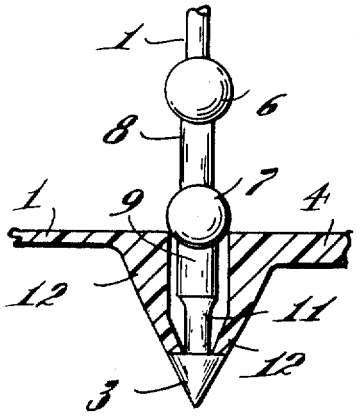
FIG. 4 is a section of the head and socket after the head has been inserted.

In the particular embodiment of the invention chosen for the purpose of illustration the device comprises a filament 1, a socket 2 and a head 3 for insertion into the socket, the filament having an extension 4 for attachment to a tag T. Behind the head 3 the filament is provided with two enlargements 6 and 7 and two portions 8 and 9 of increased diameter to facilitate insertion of the head into the socket and to limit the extent of insertion. Immediately behind the head is a neck 11 of reduced diameter. As shown in FIG. 3 the socket is circular and has an axial opening through which the head may pass. The exit end of the socket is slotted to form fingers 12 which converge to surround the neck 11 closely. The device is made of resilient material such as nylon so that as the head is inserted the fingers expand and then snap in behind the head as shown in FIG. 4. To detach the head end of the filament from the socket the head may be broken off at the neck 11 and to facilitate this breakage the neck may be annealed to increase its brittleness. When using nylon the device, or at least the head end of the device, is preferably annealed for about three minutes at a temperature of approximately 240° F. The device is preferably molded and stretched as disclosed in the copending application of Arnold R. Bone, Ser. No. 601,002, filed Dec. 12, 1966.

The device may be attached to the tag T as described and claimed in my copending application Ser. No. 633,783 filed on even date herewith. As there disclosed the end 4 is provided with an enlargement 13 having a lateral protuberance which is inserted through an opening in the tag, and after insertion the projecting end of the protuberance is expanded by heat and pressure to form a head 14.

Figure 5:
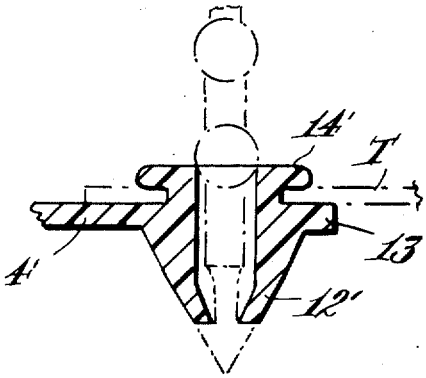
FIG. 5 is a view like FIG. 4 showing a modification.

In the modification shown in FIG. 5 the socket 12', corresponding to 12 in FIG. 4, also serves to attach the filament 4' to the tag T, thereby serving the purposes of both parts 12 and 13–14 of FIGS. 1 to 4. In the modification the socket is provided with parts 13' and 14' corresponding to parts 13 and 14 of FIGS. 1 to 4 and it is attached to the tag in the manner as the first embodiment.

It should be understood that the present disclosure is for the purpose of illustration only and that this invention includes all modifications and equivalents which fall within the scope of the appended claims.

I claim:

1. An attaching device comprising a filament, a socket on the filament and a head on one end of the filament, the socket having an opening extending therethrough so that the head may be inserted in one end of the opening and project from the other end of the opening, the head being slightly larger than the socket opening and the socket being resilient so that insertion of the head produces expansion of the socket and after the head has been inserted the socket snaps in behind the head to restrain withdrawal of the head from the socket, the portion of the filament immediately adjacent the head within the socket comprising a neck of reduced diameter which is brittle so that the projecting head may be broken off to withdraw the filament from the socket and is protected by the socket against accidental breakage.

2. An attaching device comprising a filament, a socket on the filament and a readily severable head on one end of the filament joined thereto by a portion of reduced diameter, the socket having an opening extending therethrough so that the head may be inserted in one end of the opening and project from the other end of the opening, the head being slightly larger than the socket and the socket being resilient so that insertion of the head produces expansion of the socket and after the head has been inserted the socket snaps in behind the head to restrain withdrawal of the head from the socket, the filament having an enlargement closely adjacent said head to limit the extent of insertion of the head into the socket so as to normally retain the reduced diameter portion within the socket.

3. A device according to claim 2 wherein the filament has a second enlargement back of said first enlargement and adjacent thereto to facilitate insertion of the head into the socket.

*4. The device of claim 2, in which said socket opening is of appreciable length relative to the thickness of said filament and extends between surfaces exposed at opposite sides of said device, the spacing between said head and said enlargement corresponding to said appreviable length and said head and said enlargement engaging said exposed surfaces when said socket snaps in behind said head.*

*5. The device of claim 4, in which the length of said socket and of said opening therethrough and said spacing between said head and said enlargement are many times greater than the thickness of said filament.*

*6. The device of claim 2, in which said socket projects from said filament, said other end of said opening being at*

*the end of said socket which projects from said filament and said one end of said opening being substantially at the same level as the corresponding surface of said filament.*

*7. An attaching device comprising a filament, a socket on the filament and a head on one end of the filament joined thereto by a portion having a smaller diameter than said head, the socket having an opening extending therethrough so that the head may be inserted in one end of the opening and project from the other end of the opening, the head being slightly laterally larger than the socket and the socket being radially resilient so that insertion of the head produces lateral expansion of the socket and after the head has been inserted the socket snaps in behind the head to restrain withdrawal of the head from the socket, the filament having an enlargement spaced from said head along the length of said filament to limit the extent of insertion of the head into the socket, the axial length of said socket opening being many times greater than the thickness of said filament and extending between surfaces exposed at opposite sides of said device, said socket being axially resilient, the spacing between said head and said enlargement being no greater than said axial length of said socket and said head and said enlargement simultaneously engaging said exposed surfaces when said socket snaps in behind said head.*

*8. A device according to claim 7 wherein the filament has a second enlargement back of said first enlargement and adjacent thereto to facilitate insertion of the head into the socket.*

*9. The device of claim 7, in which said socket projects from said filament, said other end of said opening being at the end of said socket which projects from said filament and said one end of said opening being substantially at the same level as the corresponding surface of said filament.*

References Cited

The following references, cited by the Examiner, are of record in the patented file of this patent or the original patent.

UNITED STATES PATENTS

| | | | |
|---|---|---|---|
| 1,237,034 | 8/1917 | Harris | 292—322 |
| 1,830,950 | 11/1931 | Lake | 292—322 X |
| 3,009,381 | 11/1961 | Rapata | 40—20 X |
| 3,290,080 | 12/1966 | Dawson | 292—322 |

FOREIGN PATENTS

| | | | |
|---|---|---|---|
| 1,264,553 | 5/1961 | France | 24—16 PB |
| 1,288,128 | 2/1962 | France | 24—16 PB |
| 1,332,239 | 6/1963 | France | 24—16 PB |
| 1,336,617 | 7/1963 | France | 24—150 FP |
| 1,468,568 | 12/1966 | France | 24—30.5 P |
| 371,927 | 1963 | Switzerland | 292—322 |

DONALD A. GRIFFIN, Primary Examiner

U.S. Cl. X.R.

24—150 FP